United States Patent [19]

Johnstone

[11] 3,924,701

[45] Dec. 9, 1975

[54] TWO-SPEED, SELF-PROPELLED DOLLY FOR MOVING AND ELEVATING A MOBILE HOME OR OTHER LOAD

[76] Inventor: Colin G. Johnstone, 38732 Puerta St., Palmdale, Calif. 93550

[22] Filed: Oct. 11, 1974

[21] Appl. No.: 514,140

[52] U.S. Cl. ................................. 180/6.5; 254/7 R
[51] Int. Cl.² ..................................... B62D 11/04
[58] Field of Search ............ 180/6.5, 6.48, 6.7, 11, 180/12; 280/425; 254/7 R, 7 C, 8 R

[56] References Cited
UNITED STATES PATENTS

| | | | |
|---|---|---|---|
| 848,804 | 4/1907 | Bruen | 254/7 C |
| 1,250,840 | 12/1917 | Furst | 254/7 R |
| 2,853,810 | 9/1958 | Earley | 180/6.5 X |
| 2,904,308 | 9/1959 | Vergara | 254/8 R |
| 2,966,222 | 12/1960 | Lambert | 180/6.7 |
| 3,194,017 | 7/1965 | Weisenbach | 180/6.7 X |
| 3,321,180 | 5/1967 | Hutchinson | 254/7 R |

*Primary Examiner*—Robert R. Song
*Assistant Examiner*—John A. Pekar
*Attorney, Agent, or Firm*—Forrest J. Lilly

[57] ABSTRACT

A two-speed, self-propelled dolly intended for moving and elevating a load such as, for example, a mobile home. A generally rectangular frame is supported by a pair of endless belt tracks mounted on its opposite sides. A load engaging member is raised and lowered by an elevating unit connected with the frame, including at least one power driven screw jack. A pair of drive systems, one for each belt, is provided. Each drive system includes a drive wheel rotatably mounted on the frame and engaging the associated belt track. Each drive system includes a reversible, synchronous electric motor having an output shaft which is coupled to the associated belt track by a two-speed gear box which drives the track either at a traverse speed approximately equal to the walking pace of an adult human or at a relatively slower, load-carrying speed. Each drive system further includes a direction selector for controlling the rotation of the associated motor in forward and reverse directions, and a speed selector connected to the associated gear box for selecting driving motion of each belt track at the traverse speed or at the load-carrying speed.

10 Claims, 12 Drawing Figures

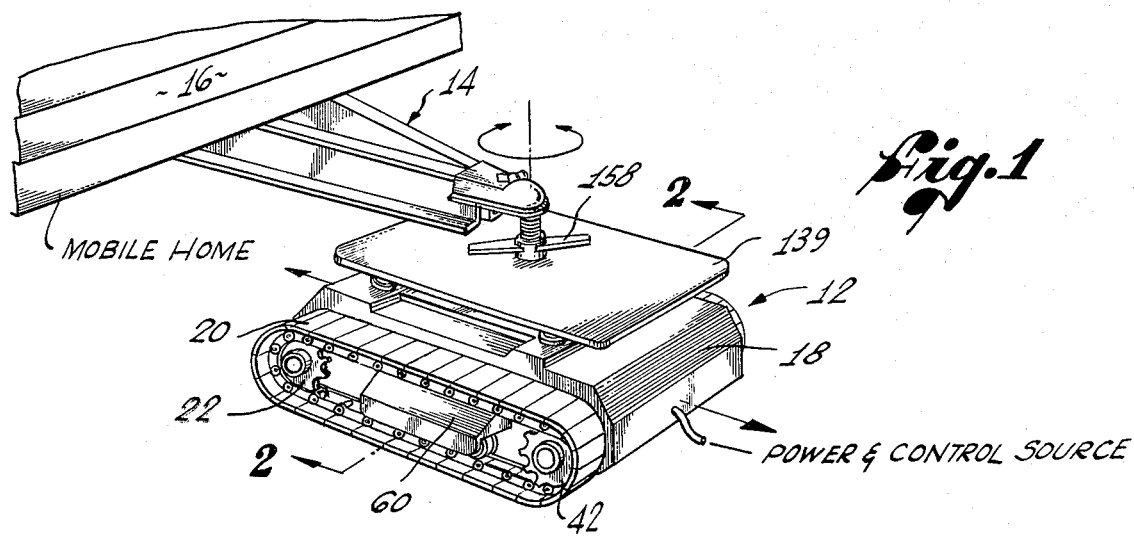
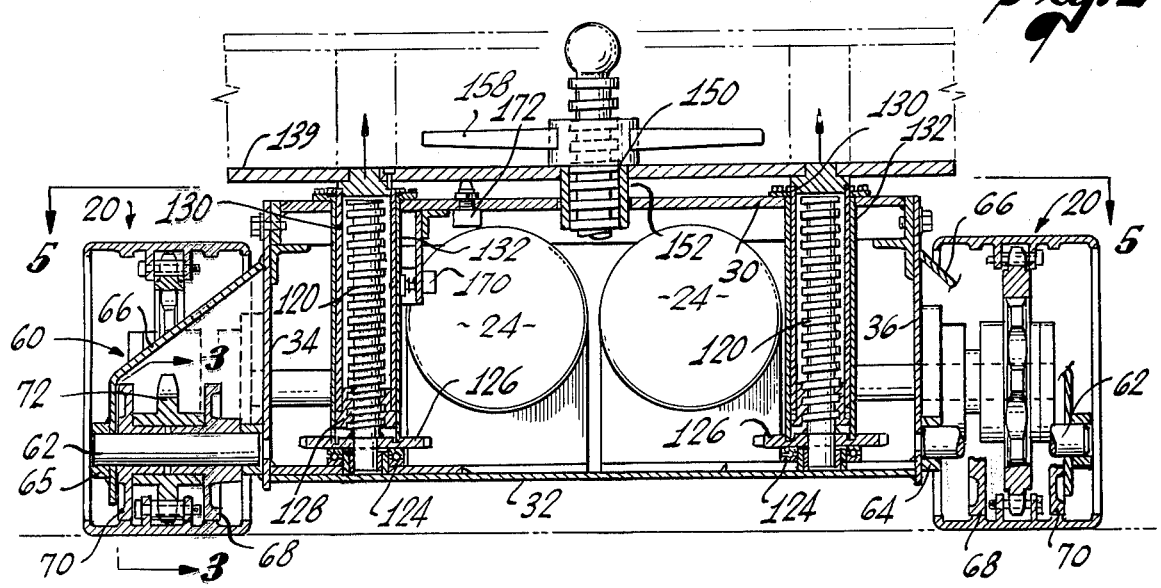
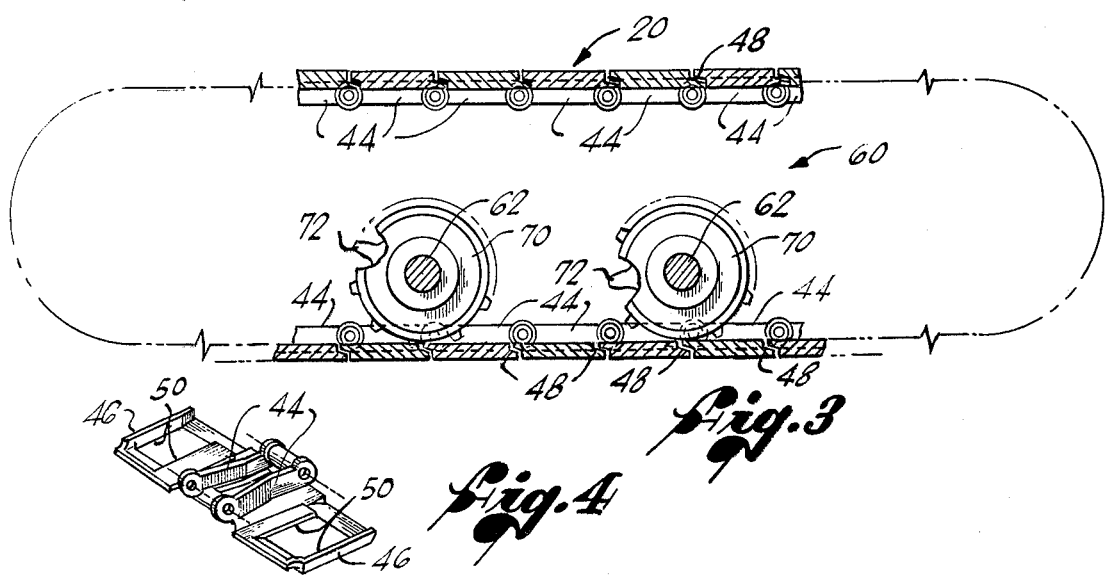

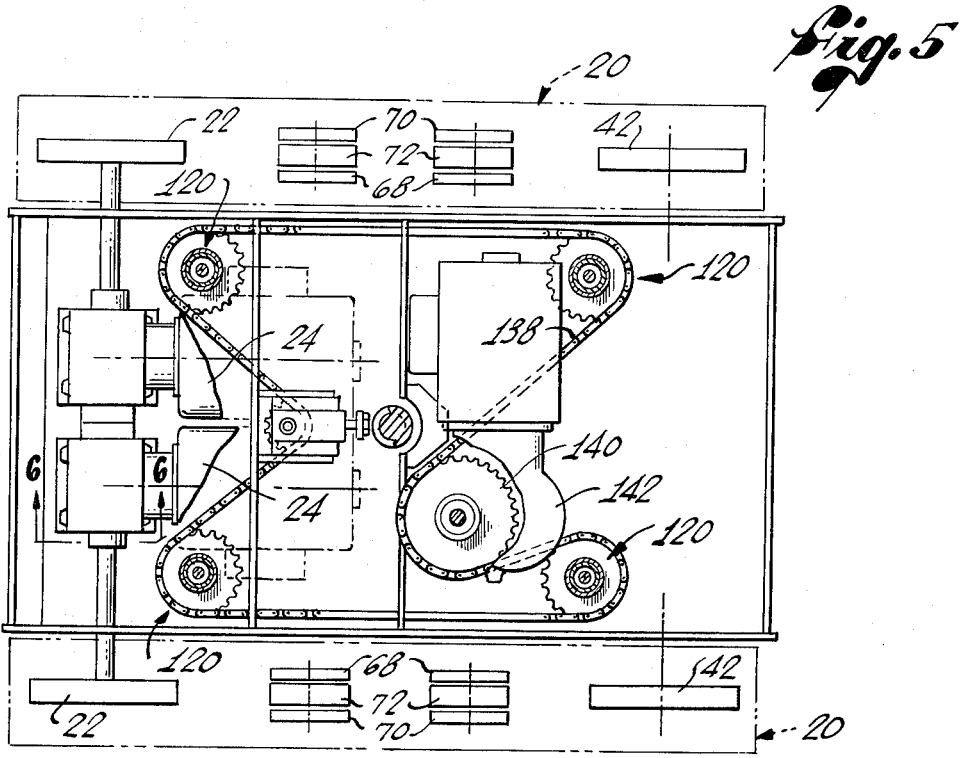
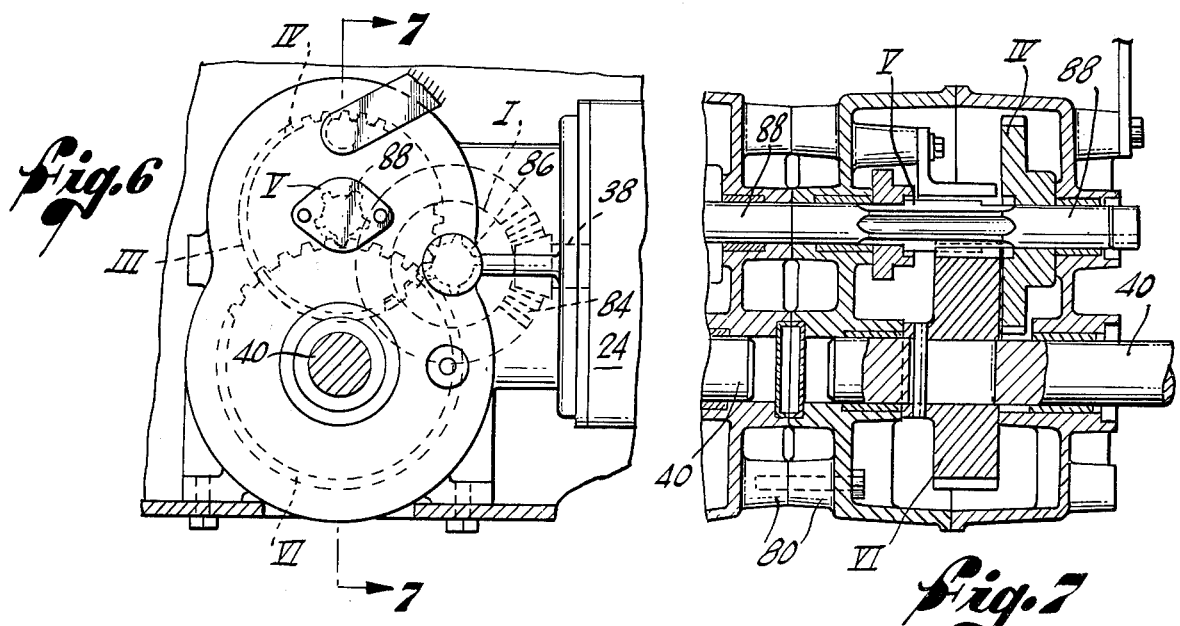
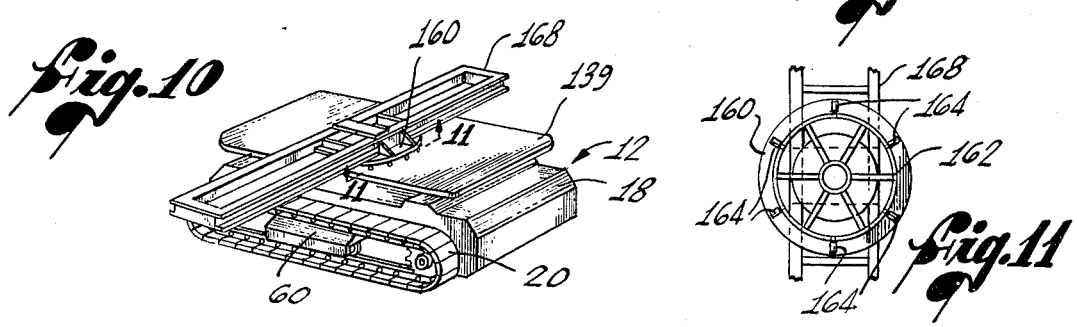

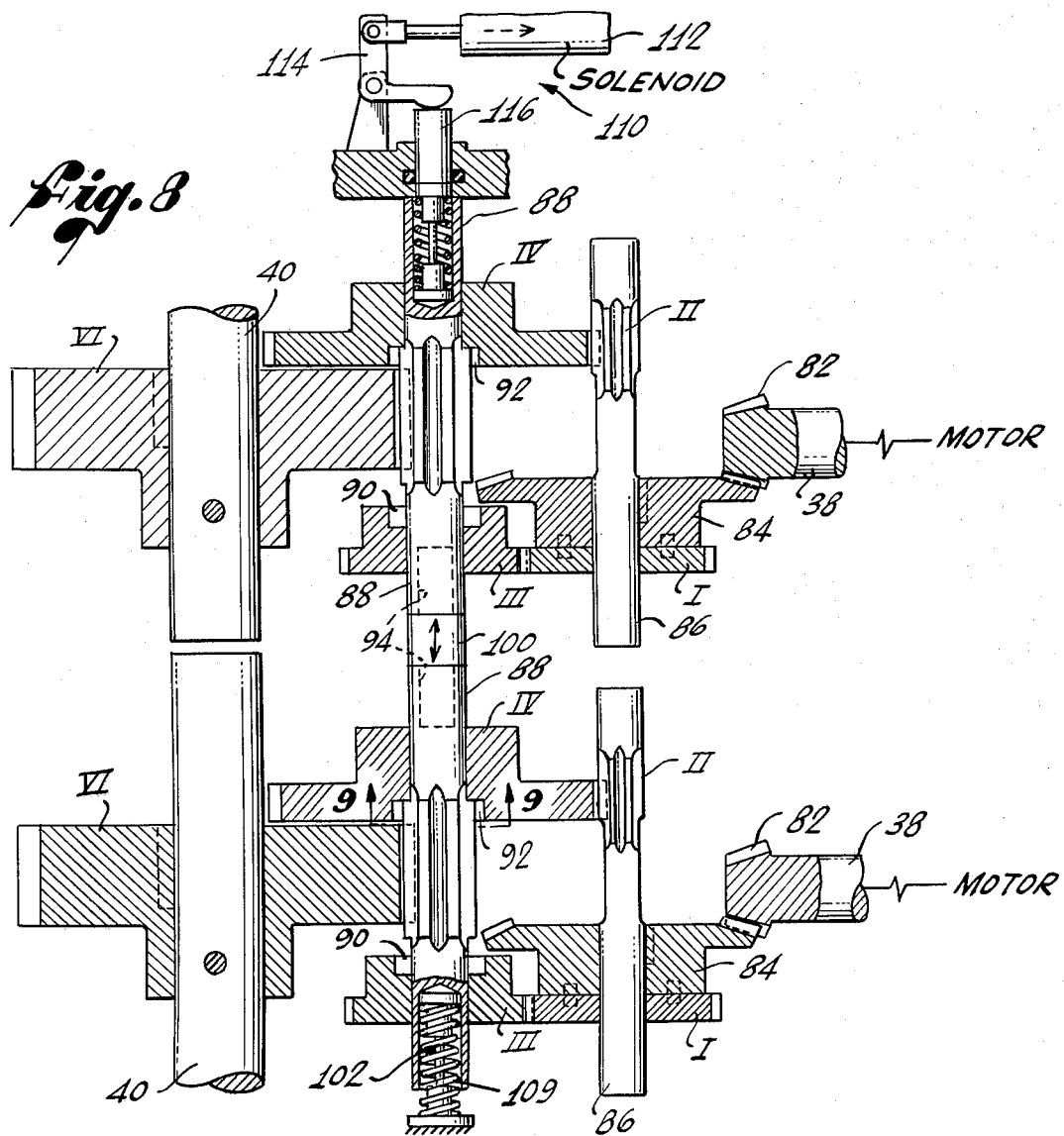
Fig. 8
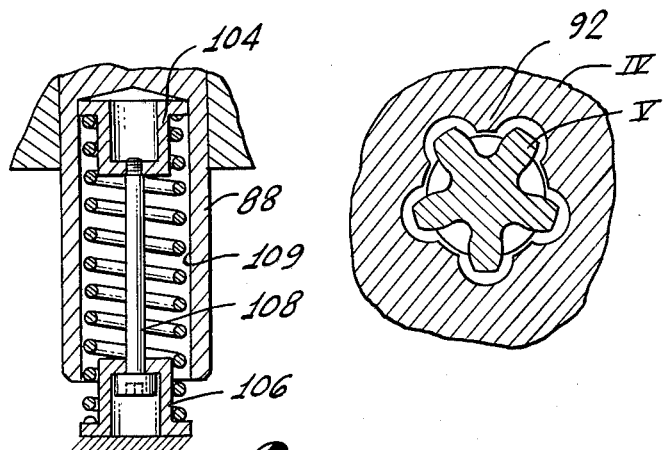
Fig. 12
Fig. 9

TWO-SPEED, SELF-PROPELLED DOLLY FOR MOVING AND ELEVATING A MOBILE HOME OR OTHER LOAD

BACKGROUND OF THE INVENTION

This invention relates to a self-propelled dolly for moving and elevating a load and, in particular, to a self-propelled dolly suitable for moving and maneuvering a mobile home into and out of its parking position.

In setting up a mobile home at its parking position or removing it, there can be difficult problems associated with elevating and maneuvering the mobile home within what may often be a relatively confined maneuvering area. To perform this function, it has previously been known to utilize a self-propelled dolly which can be guided beneath the modile home and which has a lifting system for engaging and lifting the home at least partially off its wheels thereby enabling the home to be maneuvered in the elevated condition by motion of the dolly. One such prior dolly includes a generally rectangular frame provided with endless belt tracks mounted along its opposite sides. Each track is driven by a drive sprocket engaging the interior of the track with a chain drive bring provided between each drive sprocket and an associated one of two reversible electric motors. The prior vehicle included four vertical manual screw jacks at its corners, the jacks being joined at their upper extremities by cross beams supporting a load-carrying beam which could be moved into underlying supporting relation with the base of the mobile home.

Certain problems may, however, be encountered with a prior self-propelled dolly of the type described. One problem may arise from the absence of provision in the prior device for changing the speed of movement of the dolly in its load-carrying mode as compared with its traverse mode in which the dolly is maneuvered into position to assume the load or to move away after the load has been moved and disengaged. During the load-carrying movement, it is necessary to move the dolly at a very slow speed, much less than the walking speed of an adult human for example, in order to avoid imposing excessive forces on the mobile home structure and to avoid swaying or rocking the mobile home which might tilt it off its position of support on the dolly. On the other hand when the dolly is being maneuvered in the unloaded condition, it is necessary to have a rate of movement at least approximately equal to that of an operator walking adjacent to and controlling the dolly in order to avoid unnecessary waste of time.

It would be desirable, therfor, to have a self-propelled dolly capable of movement at approximately a human walking pace during its unloaded, traverse mode of operation and at a much slower speed (e.g. one-tenth of the traverse speed) during carrying of the load. To achieve this desirable result is far from simple as a dolly must necessarily be very low in height if it is to pass beneath a mobile home, which limits the complexity of the speed control structure which can be included in the dolly. Moreover, it is desirable to use reversible, synchronous electric motors so that both tracks can be run at the same speed to enable the vehicle to move easily in a straight line, thereby largely precluding the use of relatively and more expensive variable speed electric motors.

Another problem of the prior art device could arise in using the manually raised jacks positioned on the frame. Manual operation of lifting jacks is inherently slow in view of the large loads involved and the fine pitch of the threads which are necessary to operate manual jacks under such loads.

The load-carrying beam used with the prior art device could also present difficulties in that no provision was included for swiveling the beam relative to the direction of motion of the frame. Quite often, in maneuvering a mobile home, it is necessary to move the dolly supporting the home in a direction oblique to the center line of the mobile home. With the supporting arrangement of the prior device comprising a fixed transverse beam underlying the vehicle being transported, an attempt to move the frame obliquely to the mobile home, could impose such high torsional loads on the beam as to deform it or break its point of connection to the lifting jacks, thereby creating a hazardous condition with respect to the support of the mobile home on the dolly.

SUMMARY OF THE INVENTION

The present invention provides a self-propelled dolly for moving and elevating a load, which is intended to obviate or minimize problems of the type just discussed. In particular, a self-propelled dolly according to the invention is suitable for maneuvering a mobile home into its position, with a minimum expenditure of labor and effort.

A self-propelled dolly constructed according to the invention includes a frame supported by a pair of endless belt tracks movably mounted on opposite sides of the frame. A load support, adapted to releasably engage the load, is connected to the frame by a elevating unit which enables the load support to be selectively raised and lowered thereby raising and lowering the load relative to the frame. The dolly is provided with a pair of drive systems each driving one of the pair of belt tracks. Each drive system includes a drive wheel rotatably mounted on the frame, drivingly engaging an associated belt track. Each drive system further includes a reversible, synchronous electric motor and a two-speed gear box drivingly coupling the output shaft of the electric motor to the associated drive wheel to drive the associated track belt thereby moving the frame along the ground. The gear ratios are such that the frame moves either at a traverse speed approximately equal to the walking pace of an adult human or at a relatively, slower load-carrying speed. By the use of the two synchronous elecric motors in conjunction with the two, two-speed gear boxes, a desirable result is achieved wherein the dolly can be moved at a low speed consistent with safety and avoidance of damage to the mobile home when it is carrying a load and at a higher, traverse speed to avoid wasted time when the dolly is moving in an unloaded condition. This desirable result is achieved by the use of two, two-speed gear boxes thereby eliminating the need for relatively more expensive variable speed electric motors or relatively complex clutch mechanisms which would be both costly and difficult to install within the very limited head space available in the dolly.

Each two-speed gear box includes a housing in which a first shaft is rotatably mounted. A suitable drive train transfers the rotary motion of the associated motor output shaft to the first shaft to rotate spaced, parallel first and second gear wheels mounted on the first shaft. The first and second gear wheels mesh peripherally with spaced, parallel third and fourth gear wheels mounted on a second shaft positioned in spaced, parallel in relation to the first shaft. The third and fourth gears on their radially opposed faces include first and second clutch portions. A fifth gear wheel, mounted on the second shaft positioned axially between the third and fourth gear wheels, includes end portions which can be slid into driving engagement with the clutch portions to drivingly engage the fifth gear wheel with one at a time of the third and fourth gear wheels. A sixth gear wheel meshes peripherally with the fifth gear wheel in both of its positions. The sixth gear wheel is drivingly connected to the drive wheel for the associated belt track. The gear ratios for the various gear wheels are such that when the fifth wheel is engaged with the third gear wheel, the belt track is driven at traverse speed while when the fifth gear wheel is engaged with the fourth gear wheel, the belt track is driven at load-carrying speed. The simple gear arrangement described is of low complexity and can be readily installed within the limited confines available in a dolly while still providing the two-speed capability required for efficient operation.

The shifting mechanism for moving the fifth gear wheel between its opposite positions includes a spring device acting on one end of the second shaft to urge the fifth gear wheel continuously into engagement with the fourth gear wheel. This arrangement is a valuable fail-safe feature because it assures that the gear change moves in the direction of slower speed travel should there be any equipment failure. In this connection it may be pointed out that the difference between the traverse speed and the load-carrying speed is of the order of ten to one so that the load-carrying speed is only about one-tenth of the walking pace of a human adult. To move the fifth gear wheel into contact with the third gear wheel thereby shifting up to traverse speed, an electrical solenoid is mechanically coupled to the opposite end of the second shaft. When the solenoid is energized, the shaft is moved in an opposite direction, overcoming the force exerted by the bias spring, so that the fifth gear wheel shifts into clutching engagement with the third gear wheel thereby driving the sixth gear wheel connected to the belt drive wheel to move the track at traverse speed.

Another significant feature of the invention resides in the load-elevating structure. This includes four elevating units positioned at the corners of the frame each of which includes a screw jack carrying a threaded traveling member which supports a vertically moving ram. The four screw jacks are provided at their lower ends with sprockets engaged by a common drive chain. The drive chain is engaged by a sprocket connected to the output shaft of another two-speed gear box driven by a lifting motor. The lifting motor and the two-speed gear box associated with it are of similar construction to that already described for the motors and gear boxes driving the belt tracks. As a result the jacks can be operated readily to raise and lower the load either at a normal speed or at a relatively slower speed when such is deemed necessary to avoid overloading the invention.

The foregoing features and advantages of the invention, together with other advantages and structural features, are set forth more fully in the detailed description which follows.

BRIEF DESCRIPTION OF THE DRAWINGS

A self-propelled dolly constructed in accordance with the preferred embodiment of the invention is illustrated in the accompanying drawings in which:

FIG. 1 is a perspective view of a self-propelled dolly according to the invention, shown attached to the A-frame hitch of a mobile home;

FIG. 2 is a cross-sectional end view of the self-propelled dolly shown in FIG. 1 taken along the lines 2—2 therein; FIG. 3 is a cross-sectional side view of a portion of the self-propelled dolly shown in FIG. 2 taken along the lines 3—3 therein;

FIG. 4 is a perspective view on an enlarged scale of one track plate utilized in a belt track forming a part of the self-propelled dolly shown in FIG. 1;

FIG. 5 is a top view, partially in cross-section, of the self-propelled dolly shown in FIG. 2 taken along the lines 5—5 therein;

FIG. 6 is a side view partially in cross-section of a gear box forming a part of the self-propelled dolly shown in FIG. 5 taken along the lines 6—6 therein;

FIG. 7 is a cross-sectional end view of the gear box shown in FIG. 6 taken along the line 7—7 therein;

FIG. 8 is a cross-sectional plan view on an enlarged scale of a gear shift mechanism utilized to shift gears in the self-propelled dolly shown in FIG. 5, with surrounding portions of the housing and frame omitted for clarity;

FIG. 9 is a cross-sectional end view of a portion of the gear shifting mechanism shown in FIG. 8 taken along the lines 9—9 therein;

FIG. 10 is a perspective view of a self-propelled dolly according to the invention equipped with a swiveling supporting beam for engaging the underside of the load;

FIG. 11 is a view of the underside of a portion of the beam shown in FIG. 10 taken along the lines 11—11 therein; and FIG. 12 is a cross-sectional side view of a tethered spring device forming a part of the gear shift mechanism shown in FIG. 8.

DETAILED DESCRIPTION

Referring to FIG. 1 of the drawings, a self-propelled dolly constructed in accordance with the preferred embodiment of the invention, is there shown engaged with the A-frame hitch 14 of a mobile home 16. The dolly includes a generally rectangular, hollow box-like, sheet metal frame, generally designated 18, supported for motion in a direction longitudinally of the frame by two endless belt tracks 20 mounted on the left and right sides of the frame.

Each belt track is driven by a separate drive system. Because the drive systems for both belt tracks are identical, only the drive system for the left side belt track 20 will be described, and it will be understood that the drive for the right side belt track is identical. The belt track 20 is driven by a sprocket 22 at the forward end of the track. A transit motor 24 is drivingly coupled to the belt drive sprocket 22 through a two-speed gear box 26 (FIG. 5). The transit motors 24 are reversible, synchronous electric motors running at a constant rpm when connected to an external source of alternating current mains power. By axially shifting a selector shaft in the gear box (as will be described in detail) the belt drive sprocket 22 can be driven either at a traverse speed at which the dolly moves along the ground at a speed approximately equal to the walking space of an adult human or at a slower, load-carrying speed, approximately one-tenth of the traverse speed in the preferred embodiment, which is used when the dolly is moving under load. With this construction it is possible to avoid disadvantages associated with certain prior art dollies which could move only at a single speed. With a single speed dolly designed to operate at an appropriate speed to carry the load, its rate of motion would be too slow when maneuvering the dolly along the ground in an unloaded condition thereby leading to a wastage of time unacceptable to persons such as mobile home site opeators, sellers and owners of mobile homes and other persons interested in maneuvering homes. On the other hand, a single speed dolly designed to operate at a satisfactory speed when unloaded could be dangerously fast to operate when the mobile home was supported thereon because the rapid rate of motion could impose excessively high stresses on the trailer and in addition could lead to unbalancing and loss of stability of the mobile home on the dolly during maneuvering.

Considering the frame 18 in more detail, it includes (FIG. 2) horizontal, vertically spaced, upper and lower walls 30 and 32 connected along their longitudinal edges by vertical left and right side walls 34 and 36. Suitable enclosing structure is provided at the front and rear ends of the frame. The left and right transit motors 24 are fixedly connected to the frame within its interior spaced on opposite sides of the longitudinal center line of the frame adjacent its forward end (FIG. 5). Each motor is a single phase alternating current, reversible electric motor adapted to run at approximately constant r.p.m. when supplied with alternating mains current. Such a motor will be referred to hereafter loosely as a synchronous motor. Each motor includes an instant reversing switch enabling the direction of rotation of the motor to be instantly reversed. In the preferred embodiment the electric motor is a 56C ½ H.P. single phase 115 volts a/c motor manufactured by Baldor Electric Motors, Fort Smith, Arkansas fitted with a type 4534 A-O instant reversing switch made by White and Rogers, St. Louis, Mo. Suitable control cables (not shown) to a remote, handheld control box and to the external power source are included in the electrical circuitry to the motors and reversing switch.

Each transit motor 24 has a forwardly extending motor output shaft 38 (FIG. 6) which enters the associated one of the gear boxes 26. Each gear box 26 has a transversely extending output shaft, or axle 40, which is connected to the associated one of the track drive sprockets 22 to drive the associated belt track 20. Depending upon the direction of energization of the transit motors, the belt track will be driven in a direction which moves the frame either forwardly or backwardly in a longitudinal direction relative to the frame. By energizing the motors oppositely so that one track is running forwardly and the other in reverse, the dolly can be steered from side to side as desired.

Support of the belt track at their opposite ends is provided by two idler sprocket 42 (FIG. 5) of corresponding dimensions to the associated drive sprockets, positioned adjacent the rear end of the frame and mounted thereto for rotation by conventional axle structure (not shown). Each belt track is formed of a plurality of identical track plates (FIG. 4) each of which comprises a generally rectangular, transversely extending plate having a longitudinal link 44 fixedly secured to its vertically inner side. Each link is open at its trailing end to receive the leading end of the next following link with the link being connected by transverse pins, in a manner generally known for endless belt tracks. Spaced on either side of the link are two longitudinally extending, upwardly facing flat portions 46 which form a track for two bogie rollers to be described. At its trailing end each track plate is provided with a lip 48 which underlaps the vertically inner side of the leading end of the next following track plate (FIG. 3). As the track plates articulate relative to each other in passing around the drive sprocket 22 and the idler sprocket 42, the lip portions 48 prevent stones and other hard objects coming between adjacent track plates and thereafter preventing return of adjacent track plates to the aligned position along the flat portion of their travel, thereby to prevent track breakage. A central opening 50 is provided in each track plate in its central region embraced by the link 44 to prevent mud and other materials becoming packed between the links and preventing their travel around the driving and idler sprockets.

In order to insure that the portion of each belt track 20 in contact with the ground provides distributed support for the frame and to prevent buckling of the central region of the track as the vehicle turns, two bogie units 60 are provided, each positioned in the central region of each belt track. Each bogie unit (FIG. 2 and 3) includes two longitudinally spaced, transversely extending idler axles 62 each of which is supported at its inner end by a bearing 64 carried by the adjacent vertical side wall of the frame. At its outer end, each axle 62 is supported by a bearing 65 carried by a sidewardly extending subframe 66 secured at its upper end to the vertical side wall of the frame. Mounted on each of the axles 62 are two inner and outer idler rollers 68 and 70 which roll on the previously mentioned portions 46 of the track plates as they pass beneath the idler rollers, thereby maintaining the central region of each belt track flatly in contact with the ground. Also mounted on each axle 62, between the inner and outer idler rollers, is a toothed idler sprocket 72. The toothed portions of the idler sprocket 72 enter each link 44 as it passes beneath the idler sprocket.

In the absence of the idler sprocket 72, there would be a tendency as the vehicle made a turn for the track to flex to a transverse inclination relative to the idler rollers 68 and 70 which rollers could possibly shear off adjacent portions of the links 44 or the pins connecting the links. By providing the idler sprocket 72, each track plate is stabilized in position against side forces as it passes beneath the rollers so that turning motion of the dolly does not lead to shearing of any of the links 44 or connecting pins on the track plates. This has been found, in practice, to provide significant advantages over prior art power driven dollies wherein turning motion of the tracks under the heavy loads involved in moving a mobile home could lead to frequent breakage of individual track plates.

Each of the transit gear boxes 26 includes a housing generally designated 80 (FIG. 6) into which projects the output shaft 38 of the associated transit motor 24. At its end the output shaft is provided with spur teeth 82 (FIG. 8) which mesh with a pinion gear 84 fixedly mounted on a first shaft 86 rotatably mounted in the housing. Fixedly secured to the first shaft 86 are spaced, parallel first and second gear wheels I and II to which the driving motion of the pinion 84 is imparted. The first and second gears I and II are in meshing peripheral engagement with spaced, parallel third and fourth gears III and IV respectively which are mounted on a second shaft 88. The second shaft 88 is supported by the housing 80 and is axially slidably relative to the third and fourth gears III and IV which are mounted for rotation on and relative to the second shaft 88. The opposed radial faces of the third and fourth gear wheels III and IV are provided with first and second clutch portions 90 and 92, respectively. Each of the clutch portions (FIG. 9) comprises a recessed plurality of teeth 94 extending axially into the face of the associated one of the third and fourth gears III and IV. Fixedly mounted on the second shaft 88, between the third and fourth gears III and IV, is a fifth gear wheel V which meshes peripherally with a sixth gear wheel VI fixedly secured to the axle 40 connected to the associated drive sprocket for the belt track.

The arrangement of the teeth 94 on the first and second clutching portions 90 and 92 is such that by axially shifting of the second shaft 88, the fifth gear wheel V can drivingly engage its adjacent end portions with either of the clutch portions 90 and 92 on the third and fourth gear wheels III and IV, respectively. When the fifth gear wheel V is drivingly engaged with the third gear wheel III, it will be seen that the drive train from the electric motor output shaft 38 to the axle 40 comprises three meshing sets of gears, namely: spur gear 82 engaging pinion gear 84; first gear wheel I engaging third gear wheel III; and fifth gear wheel V engaging sixth gear wheel VI. The gear ratios of these three meshing sets of gears are chosen such that the frame is moved along the ground at the traverse speed which is approximately equal to the walking pace of an adult human.

When the second shaft 88 is shifted axially to disengage the fifth gear wheel V from the clutching portions 90 on the third gear wheel III and engage with the clutching portions 92 on the fourth gear wheel IV, the drive train between the electric motor and the axial 40 has the same initial and final pairs of meshing gears but the intermediate pair of meshing gears now comprises the second gear II meshing with the fourth gear IV. The ratio of gear II to gear IV is approximately one-tenth of the ratio of gear I to gear III, with the result that the dolly now moves at a load-carrying speed approximately one-tenth of the traverse speed. This load-carrying speed, which is approximately one-tenth of an adult's walking pace, is much more appropriate for maneuvering a large load such as a mobile home because the forces imposed on the mobile home are less at the lower speed and the risk of unbalancing the mobile home from the dolly or otherwise creating a hazardous condition is much reduced.

The two-speed gear box described is of very compact construction so that it can fit within the very limited vertical dimensions of a powered dolly which are circumscribed by the limited clearance available beneath a mobile home which the dolly must be able to pass under. Other expedients for varying the speed such as the use of a friction plate clutch or variable speed electric motors would either occupy too much space for use in a power dolly capable of moving beneath a mobile home or would obviate the opportunity to use synchronous alternating current electric motors which are substantially less costly than variable speed motors. Moreover with variable speed motors there would be a problem of controlling the speed of both motors to be the same whenever it was desired to move the dolly in a straight line direction whereas synchronous motors operating at the same speed pose no comparable difficulties.

As shown in FIG. 9, the clutching teeth 94 on the faces of the third and fourth gears III and IV are cut to have a very loose fit with respect to the adjacent end portions of the teeth on the fifth gear wheel V. In view of the relatively low rotational speeds of the moving parts and the substantial clearance provided, it has been found that the fifth gear wheel V goes into clutching engagement with the teeth 94 on most occasions without interference, so that shifting from one speed to the other is easy. On the occasions when the teeth are in interfering alignment so that they cannot go immediately into engagement, continuing rotation will move the teeth into a position where they can slide axially so that clutching engagement is achieved.

In order to shift the fifth gear wheel V between its alternative positions of clutching engagement with either the third or fourth gear wheels III and IV, selector structure is provided as shown in FIG. 8. The two, second shafts 88 of the two gear boxes 28 project outwardly of their respective casings 80 and are axially aligned with each other. At their near ends the two second shafts 88 are each provided with an internal bore 94. A spacing member 100 having a central region of the same diameter as the two secondary shafts 88 and end portions of reduced diameter adapted to enter the two bores 94, connects the two shafts 88. The enlarged central region of the spacing member 100 transfers axial sliding motion of one of the second shafts 88 to the other in either direction. However the two second shafts 88 can rotate in opposite directions relative to each other when the motors are being turned in opposite directions to turn the vehicle.

Both second shafts 88 are resiliently biased in such a direction as to urge the fifth gear wheels V into clutching engagement with the third gear wheels IV. The pins are provided by a spring unit 102 acting on the remote end of the second shaft 88 of the left gear box 28. The spring unit 102 (FIG. 12) includes two spaced aligned cup-shaped bushings 104 and 106. A headed rod 108 passes slidably through an opening in the bushing 106 and is threaded at its free extremity into the other bushing 104. A compression spring extends between the bushings 104 and 106 so that maximum expansion of the spring is limited by contact of the head on the rod 108 with the end of the bushing 106 while contraction of the spring is permitted by telescoping motion of the heat of the rod towards the open end of the bushing 106. The remote end of the bushing 106 is mounted against the adjacent portion of the frame so that the bushing 104 presses against the base of a bore 109 in the left hand shaft 88 to urge it to the right thereby biasing the gears V into engagement with the gears IV.

To move the gears V in the opposite direction to engage with the gear wheels III, an actuator designated generally 110 is provided. The acuator 110 includes a linearly acting, electrical solenoid 112 connected to one arm of a right angle crank 114 connected at its fulcrum to adjacent portions of the frame. Suitable electrical circuitry (not shown) for operating the solenoid is included in the previously mentioned control box held by the operator. The other arm of the crank 114 rotates in an arc aligned generally with the centerline of the adjacent second shaft 88 and contacts a buttom 116 mounted for axial sliding motion in the frame. Interposed between the button 116, and received within a bore 111 in the adjacent end of the righthand one of the second shafts 88, is a second spring unit 118 of similar construction to the previously described spring unit 102. The spring in the second spring unit 118 is however of greater stiffness than the stiffness of the spring in the first spring unit 102 so that the letter will compress first. Thus, when the solenoid 112 is energized to move the second shaft 88 in a direction bringing the gear wheels V into clutching enegagement with the gear wheels III, the spring in the unit 102 is compressed permitting the gears V to move out of engagement with the gears IV and into engagement with the gears III.

If, at the time the actuator is energized, the gear teeth 94 on either of the third gears III is in a position where it interferes with the ends of the adjacent teeth on the gears V so that the teeth cannot go immediately into mesh, then the spring in the second spring unit 118 compresses thereby avoiding damage to the actuator and selector system. As soon as continued rotation brings the gears into mesh, the spring 118 expands forcing the gears V into engagement with the gears III.

It will be seen that the two-speed gear box and selector system described provides a convenient, compact mechanism for selecting two different speeds of motion of the vehicle without the use of complicated friction clutches or the like or requiring the use of variable speed motors. In addition, the spring loading provided at opposite ends of the shaft avoids the possibility of damage due to shifting of the gears at a time when they would be in an interfering position. Also the use of a bias which acts constantly in the direction moving the gears V into engagement with the gears IV provides a fail-safe condition in which failure of the actuator would result in the vehicle going into its slower, load-carrying speed, thereby minimizing the opportunity for accident.

The dolly also includes a lifting system which is necessary when the dolly is being used to elevate the mobile home, as is frequently required during maneuvering. The lifting system (FIG. 2) includes four elevating units 120 distributed in a rectangular pattern symmetrically on opposite sides of the dolly's center line. Each of the elevating units includes a vertically extending threaded screw jack 122 (FIG. 5) mounted at its lower end in a thrust bearing 124 for rotation about a vertical axis. A horizontal jack drive sprocket 126 is mounted on each screw jack adjacent its lower end. Positioned above the drive sprocket is a traveling member 128 threadably engaging the screw jack and supporting a vertical tubular ram 130 extending upwardly and beyond the screw jack in concentric relation. The exterior peripheral surface of the ram 130 and adjacent portions of the outer peripheral surface of the traveling member 128 slide against and are supported by a stationary cylindrical casing 132 connected at its upper end to, and extending through the upper wall 30 of the frame. The lower end of each casing 132 extends downwardly into an annular groove in the upper face of the associated jack drive sprocket 126 which stabilizes the lower end of the cassing. The function of the casing 132 is to provide lateral support for the ram, particularly as it approaches its fully extended position.

Elevation and retraction of the rams is accomplished by a ram drive chain 138 (FIG. 5) which passes in an endless path around the four ram drive sprockets 126 in a direction such as to raise or lower all the rams together. The ram drive chain 138 is driven by a chain drive sprocket 140 mounted on the vertically extending output shaft of a lifting gear box 142. Input to the lifting gear box is provided by a lifting motor 144. The lifting motor 144 and the gear box 142 are of the same construction as the previously described transit motors 24 and associated two-speed gear boxes 28, and function in the same manner. By selecting the direction of rotation of the motor 144 the rams can be raised or lowered while by selecting from the two different speeds available from the gear box 142, the rams can be moved vertically at two different speeds. One of the speeds is a slow speed in which the rams elevate the load slowly, while the other speed is approximately ten times faster and may be referred to as a normal speed for description hereafter.

At their upper ends the four rams 132 are fixedly connected to a horizontal, rectangular rigid metal plate 139 (FIG. 2). At its center point the plate 139 is provided with a circular opening 150. A plain circular tube 152 is fixedly mounted within the opening 150 and extends downwardly through an opening in the upper wall 30 into the interior of the frame. The tube 152 functions as a receiving and supporting channel for a helically threaded rod 154 provided with a ball fixture 156 at its upper end to engage, for example, the hitch on the mobile home. A threaded collar 158, provided with arms for movement for rotation of the collar, is mounted on the threaded shaft 154 and abuts the upper surface of the plate 139 to enable the height of the ball fixture 156 above the plate to be adjusted. When it is desired to remove the shaft 154, it is simply lifted vertically out of the supporting tube 152.

In place of the ball fixture, the dolly can be equipped, when desired, with a turntable supporting a beam which can be moved beneath the mobile home vehicle for purposes of supporting it in an elevated condition. The turntable (FIGS. 10 and 11) is a flat annular disc 160. Beneath the underside of the disc 160 is a spoked wheel 162 supporting a plurality of horizontal, radially extending rollers 164 about its periphery. The rollers are interposed between the disc 160 and the upper side of the plate 139 and support the disc for rotation. A central hub 166 at the center of the wheel 162 is aligned with the opening 150 and a vertical shaft (not shown) is slid through both the hub 166 and the tube 152 to support the disc for rotation about the center of the platform. On its upper side the disc 160 has fixedly secured to it a horizontal beam 168, fabricated as a generally rectangular framework of channel section material, extending in a generally transverse direction relative to the longitudinal axis of the dolly.

In use, the dolly is steered beneath the mobile home with the beam 168 extending in a generally transverse direction of the mobile home. The rams 138 are then extended to raise the mobile home at least partially off its rear wheels thereby placing it in a condition to be maneuvered readily upon subsequent steering motion of the dolly. As the dolly is steered, the beam 168 remains supporting the mobile home even while the steering direction of the dolly is varied, due to the swiveling motion between the axis of the beam 168 and the longitudinal axis of the power driven dolly provided by the rotatable turntable.

In order to limit the range of vertical travel of the rams, UP and DOWN limits switches 170 and 172, respectively, (FIG. 2) are provided. The UP limit switch 170 is mounted on a portion of the frame near one of the elevating units and includes a finger projecting through an adjacent opening in the ram casing 132 into sliding contact with the ram 130. The finger is spring loaded so that as the ram elevates to the position in which the traveling member moves above the finger of the UP limit switch 170 the finger extends and the UP limit switch cuts off to terminate application of power to the lifting motor 144. The limit switch limits the upward movement of the ram so that in the extreme UP position a substantial length of the ram is still supported by the ram casing to provide stability.

The DOWN limit switch 172 is mounted on the upper wall 30 of the frame and has a sensing finger which is contacted by the underside of the plate 139 in its extreme down position to terminate power to the lifting motor.

Although the invention has been described with reference to one preferred embodiment, it will be appreciated that many modifications, substitutions, additions and deletions may be made without departing from the spirit of the invention as described herein and defined in the appended claims.

I claim:

1. A self-propelled dolly for moving and elevating a load, comprising:
   a generally rectangular frame extending in a longitudinal direction;
   a pair of longitudinally extending, endless belt tracks movably mounted on opposite sides of said frame supporting said frame for motion along the ground;
   load engaging means adapted to releasably engage the load;
   elevating means connected to said frame and to said load engaging means for selective raising and lowering thereof, thereby raising and lowering the load relative to said frame;
   a pair of drive systems each driving one of said pair of belt tracks, each said drive system including,
      a drive wheel rotatably mounted on said frame drivingly engaging the associated one of said belt tracks;
      a reversible, synchronous electric motor having a rotary output shaft;
      a two-speed gear box drivingly coupling said output shaft to said drive wheel to drive the associated said belt track thereby moving the frame either at a traverse speed approximately equal to the walking pace of an adult human or at a relative slower, load-carrying speed;
      direction selector means connected to said motor and to a remote source of electric power for controlling the rotation of said motor in opposite, forward and reverse directions;
      speed selector means connected to said gear box and movable between first and second positions for selecting driving motion of said belt track at the traverse speed or the load-carrying speed, respectively;
   connecting means connecting said speed selector means of said pair of drive systems together for operation in unison between said first and second positions to ensure that both said belt tracks are operated at the same speed while allowing said belt tracks to be selectively driven in the same or opposite directions; and
   a remotely controlled actuator connected with at least one of said speed selector means for selectively controlling movement thereof between said first and second positions.

2. A self-propelled dolly as defined in claim 1 wherein,
   each said belt track includes a plurality of track plates rigidly connected together, each said track plate including
      spaced parallel longitudinal link arms on the vertically inner surface of said track plate,
   the dolly further including
      two idler sprockets each engaging one of said belt tracks adjacent the mid-point thereof, each said idler sprocket including teeth entering the space between said link arms of each said track plate as it passes beneath said idler sprocket to stabilize each said track against lateral displacement during turning motion of the dolly.

3. A self-propelled dolly for moving and elevating a load, comprising:
   a generally rectangular frame extending in a longitudinal direction;
   a pair of longitudinally extending, endless belt tracks movably mounted on opposite sides of said frame supporting said frame for motion along the ground;
   load engaging means adapted to releasably engage the load;
   elevating means connected to said frame and to said load engaging means for selective raising and lowering thereof, thereby raising and lowering the load relative to said frame;
   a pair of drive systems each driving one of said pair of belt tracks, each said drive including,
      a drive wheel rotatably mounted on said frame driving engaging the associated one of said belt tracks;
      a reversible, synchronous electric motor having a rotary output shaft;
      a two-speed gear box drivingly coupling said output shaft to said drive wheel to drive the associated said belt track thereby moving the frame either at a traverse speed approximately equal to the walking pace of an adult human or at a relative slower, load-carrying speed, each such gear box including,
         a housing, said output shaft extending into said housing;
         a first shaft rotatably mounted in said housing;
         means for drivingly connecting said output shaft to said first shaft to rotate the same;
         spaced, parallel first and second gear wheels fixedly mounted on said first shaft;
         a second shaft rotatably mounted in said housing in spaced, parallel relation to said first shaft;
         spaced, parallel third and fourth gear wheels on said second shaft, said third and fourth gears meshing peripherally with said first and second gears, respectively,
         first and second clutch portions fixedly secured to the opposed radial faces of said third and fourth gears, respectively;
         a fifth gear mounted on said second shaft positioned between said third and fourth gear wheels, said fifth gear wheel being shiftable axially between opposite
         positions in which portions of said fifth gear wheel drivingly engage one at a time of said first and second clutch portions on said third and fourth gear wheels, respectively;
         a sixth gear wheel meshing peripherally with said fifth gear in both positions thereof, said sixth gear wheel being drivingly connected to said drive wheel, said gear wheels having ratios such that the asociated one of said belt tracks is driven at the traverse speed when said fifth gear wheel is engaged with said third gear wheel and at the load-carrying speed when said fifth gear wheel is engaged with said fourth gear wheel
direction selector means connected to said motor and to a remote source of electric power for controlling the rotation of said motor in opposite, forward and reverse directions; and
speed selector means connected to said gear box for selecting driving motion of said belt track at the traverse speed or the load-carrying speed.

4. A self-propelled dolly as defined in claim 3, wherein said fifth gear wheel is fixedly mounted on said second shaft, said second shaft being axially and rotatably slidable with respect to said third and fourth gear wheels mounted thereon, the vehicle further including:
biasing means connected to said housing for resiliently urging said fifth gear wheel into driving engagement with said first clutch portions on said third gear wheel; and
actuating means connected to said housing for selectively moving said fifth gear wheel axially against said biasing means into engagement with said second clutch portions on said fourth gear wheel.

5. A self-propelled dolly as defined in claim 3, wherein said drive systems are disposed in side-by-side relation with said second shafts thereof axially aligned and extending into contact with each other at their rear ends, each said fifth gear wheel being fixedly mounted on the associated said second shaft, each said second shaft being axially and rotatably slidable with respect to said third and fourth gear wheels mounted thereon, said biasing means including a spring device contacting the remote end of one of said second shafts to continuously urge both said second shafts in a direction to move the associated fifth gears into engagement with the first clutch portions on the associated said third gears, said actuating means including an electrical actuator contacting the remote end of the opposite one of said second shafts for movement of both said second shafts in an opposite direction to move both said fifth gears into engagement with the second clutch portions on the associated said fourth gears.

6. A self-propelled dolly for moving and elevating a load, comprising:
a generally rectangular frame extending in a longitudinal direction;
a pair of longitudinally extending endless belt tracks movably mounted on opposite sides of said frame supporting said frame for motion along the ground;
load engaging means adapted to releasably engage the load;
an elevating system connected to said frame and to said load engaging means for selective raising and lowering thereof relative to said frame, said elevating system including,
at least one elevating unit having,
a vertical, threaded screw jack rotatably connected with said frame,
a threaded traveling member mounted on said screw jack for vertical motion therealong in opposite directions when said screw jack is rotated in opposite directions,
a vertically traveling ram carried by said threaded member, said ram at its upper end being connected to said load engaging means;
a reversible, synchronous electric lifting motor having a rotary output shaft;
a two-speed lifting gear box for drivingly coupling said lift motor output shaft to said screw jack for rotation thereof to raise and lower said ram, said gear means selectively moving said ram at either a normal speed or at a relatively slower, slow speed;
first and second drive systems for said first and second belt tracks, respectively, each said drive system including,
a reversible, synchronous electric transit motor having a rotary output shaft;
a drive wheel rotatably mounted on said frame drivingly engaging the associated one of said belt tracks; and
a two-speed transit gear box drivingly coupling said output shaft of said transit motor to said axle to selectively drive the associated said belt track at either a traverse speed equal approximately to the walking pace of an adult human or at a relatively slower, load-carrying speed.

7. A self-propelled dolly as defined in claim 6, including a plurality of said elevating units, each of said screw jacks being provided with a sprocket wheel fixedly mounted around its lower end, the self-propelled dolly further including:
an endless drive chain engaging each of said sprockets on said screw jacks;
a drive sprocket rotatably mounted on said frame engaging said chain;
said two-speed lifting gear box further including,
a rotary output shaft connected to said chain sprocket for driving said chain to rotate said screw jacks in unison.

8. A self-propelled dolly as defined in claim 6, wherein said elevating unit further includes:
a drive wheel mounted on the lower end of said screw jack for rotating the same; and
a cylindrical outer casing extending concentrically in spaced relation about said screw jack, said ram and said traveling member along their outer surfaces being in continuous peripheral sliding contact with the interior of said casing, said casing projecting vertically above the upper end of said screw jack, said casing being supported at its upper end by adjacent portions of said frame and having its lower end received within a concentric annular groove in the upper surface of said drive wheel.

9. A self-propelled dolly as defined in claim 6, further including:
direction selector means connected to each of said transit motors and to a source of electric power for independently controlling the direction of rotation of each said motor in opposite, forward and reverse directions; and
speed selector means connected to both of said transit gear boxes for selecting driving motion of said belt tracks at the traverse speed or the load-carrying speed.

10. A self-propelled dolly as defined in claim 6, further including:
direction selector means connected to said lift motor and to a source of electric power for controlling the direction of rotation of said lift motor in opposite raising and lowering directions; and
speed selector means connected to said lift gear box for selecting motion of said screw jack at normal speed or slow speed, respectively.

* * * * *

UNITED STATES PATENT AND TRADEMARK OFFICE
CERTIFICATE OF CORRECTION

PATENT NO. : 3,924,701
DATED : December 9, 1975
INVENTOR(S) : Colin G. Johnstone It is certified that error appears in the above–identified patent and that said Letters Patent are hereby corrected as shown below:

Column 8, line 32, delete "third" and insert therefor --fourth--.

Column 13, line 17, delete "first" and insert therefor --second--.

line 18, delete "third" and insert therefor --fourth--.

line 21, delete "second" and insert therefor --first--.

line 22, delete "fourth" and insert therefor --third--.

line 35, delete "first" and insert therefor --second--.

line 35, delete "third" and insert therefor --fourth--.

line 40, delete "second" and insert therefor --first--.

line 41, delete "fourth" and insert therefor --third--.

Signed and Sealed this

Twenty-second Day of February 1977

[SEAL]

Attest:

RUTH C. MASON
Attesting Officer

C. MARSHALL DANN
Commissioner of Patents and Trademarks